US012712766B2

(12) United States Patent
Saw

(10) Patent No.: US 12,712,766 B2
(45) Date of Patent: Aug. 18, 2026

(54) DATA AND CLOCK TRANSMISSION OVER A MAGNETIC CHANNEL

(71) Applicant: TEXAS INSTRUMENTS INCORPORATED, Dallas, TX (US)

(72) Inventor: Sooping Saw, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 50 days.

(21) Appl. No.: 18/420,276

(22) Filed: Jan. 23, 2024

(65) Prior Publication Data

US 2025/0240188 A1 Jul. 24, 2025

(51) Int. Cl.
*H04L 25/02* (2006.01)
*G06F 13/42* (2006.01)
*H04L 25/06* (2006.01)

(52) U.S. Cl.
CPC ...... *H04L 25/0266* (2013.01); *G06F 13/4291* (2013.01); *H04L 25/06* (2013.01)

(58) Field of Classification Search
CPC .. H04L 25/06; H04L 25/0266; G06F 13/4291
USPC .......................................................... 375/258
See application file for complete search history.

(56) References Cited

U.S. PATENT DOCUMENTS

2007/0009052 A1* 1/2007 Hershbarger ....... H04L 25/0284 375/258
2009/0066401 A1 3/2009 Saito
2012/0081177 A1 4/2012 Nuebling
2013/0335105 A1* 12/2013 Washiro ................ H04B 3/546 324/654
2015/0180528 A1 6/2015 Ragonese
2018/0152041 A1* 5/2018 Onishi .................... H02J 50/80
2019/0372749 A1* 12/2019 Ikeda ........................ G06F 1/12
2022/0407425 A1 12/2022 Calabrese
2022/0415829 A1 12/2022 Blecic
2023/0006559 A1 1/2023 Bertoni

OTHER PUBLICATIONS

Texas Instruments Publication; "UCC12051-Q1 High-Efficiency, Low-EMI, 5-KVRMS Isolation DC/DC Converter"; Jan. 2021; 32 pgs.
Texas Instruments; "TPSI3050-Q1 Automotive Reinforced Isolated Switch Driver with Integrated 10-V Gate Supply"; Nov. 2021—Revised Apr. 2023; 44 pgs.

(Continued)

*Primary Examiner* — Kevin M Burd
(74) *Attorney, Agent, or Firm* — Charles F. Koch

(57) ABSTRACT

A circuit includes a transformer including a primary coil and a secondary coil, the primary coil and the secondary coil being inductively coupled to one another. The circuit further includes an excitation driver circuit having a driver input and a driver output. The driver output is coupled to the primary coil and a clock circuit having a clock output is coupled to the driver input. Furthermore, the circuit includes a clock detection circuit having a detection input and a detection output, wherein the detection input is coupled to the secondary coil and a data interface circuit having a clock input, a data input and an interface output, the clock input coupled to the detection output. In addition, the circuit includes a load circuit coupled between the interface output and the secondary coil, the load circuit including a modulation input coupled to the interface output.

14 Claims, 6 Drawing Sheets

(56) References Cited

OTHER PUBLICATIONS

Analog Devices. "Low Emission, 5 kV Isolated DC-lo-DC Converters." Data Sheet ADuM6020/ADuM6028. One Way Technology, 2018-2020. pp 1-20.
Texas Instruments. "ISOW784x High-performance, 5000-VRMS reinforced quad-channel digital isolators with integraled high-efficiency, low emissions DC-DC converter." Data Sheet. SLLSEY2F—Mar. 2017—Revised Mar. 2019. pp 1-51.

* cited by examiner

DATA AND CLOCK TRANSMISSION OVER A MAGNETIC CHANNEL

TECHNICAL FIELD

This description relates to isolation communication systems, in particular, to a modulation method that facilitates both data and clock transmission over a physical magnetic channel.

BACKGROUND

Serial data communication is the process of sending data one bit at a time sequentially over a communication channel or a computer bus. In serial data communication, data is sent as a series of pulses, for example, in a serialized manner from a transmitter side to a receiver side using a synchronization clock. For the receiver side to decode the data correctly, the receiver side uses the same synchronization clock.

Isolation communication involves a method of data transfer over an isolation barrier. Isolation communication systems provide isolation between circuits operating at dissimilar operating voltages on opposite sides of the isolation barrier. The isolation communication systems can include a number of passive/active components on either side of the isolation barrier. In some examples, the isolation barrier can be accomplished through a magnetic channel, such as using inductively coupled coils or coreless transformers.

SUMMARY

An example circuit includes a transformer including a primary coil and a secondary coil, the primary coil and the secondary coil being inductively coupled to one another. The circuit further includes an excitation driver circuit having a driver input and a driver output, wherein the driver output is coupled to the primary coil and a clock circuit having a clock output coupled to the driver input. Furthermore, the circuit includes a clock detection circuit having a detection input and a detection output, wherein the detection input is coupled to the secondary coil and a data interface circuit having a clock input, a data input and an interface output, the clock input coupled to the detection output. In addition, the circuit includes a load circuit coupled between the interface output and the secondary coil, the load circuit including a modulation input coupled to the interface output.

Another example circuit includes a transformer including a primary coil and a secondary coil, the primary coil and the secondary coil being inductively coupled to one another. The circuit further includes an excitation driver circuit that is configured to provide an excitation signal to the primary coil at a clock frequency; and a clock detection circuit configured to provide a detected clock signal at the clock frequency based on a secondary voltage across the secondary coil responsive to the excitation signal. Furthermore, the circuit includes a data interface circuit configured to provide a secondary data signal to the secondary coil based on the detected clock signal and an input data; and a load circuit configured to modulate load impedance of the load circuit based on the secondary data signal.

A yet another example circuit includes a transformer including a primary coil and a secondary coil, the primary coil and the secondary coil being inductively coupled to one another. The circuit further includes an excitation driver circuit having a driver input and a driver output, the driver output being coupled to the primary coil. The excitation driver circuit is configured to provide an excitation signal at a clock frequency at the driver output. Further, the circuit includes a clock circuit having a clock output coupled to the driver input and configured to provide a clock signal at the clock frequency at the clock output and a clock detection circuit having a detection input and a detection output, the detection input being coupled to the secondary coil. The clock detection circuit is configured to provide a detected clock signal at the clock frequency at the detection output based on a secondary voltage across the secondary coil responsive to the excitation signal. Furthermore, the circuit includes a data interface circuit having a clock input, a data input and an interface output, the clock input being coupled to the detection output. The data interface circuit is configured to provide a data signal at the interface output based on the detected clock signal and input data at the data input. In addition, the circuit includes a load circuit coupled between the interface output and the secondary coil, the load circuit including a modulation input coupled to the interface output. The load circuit is configured to modulate load impedance of the load circuit based on the data signal.

DETAILED DESCRIPTION

Figure 1:
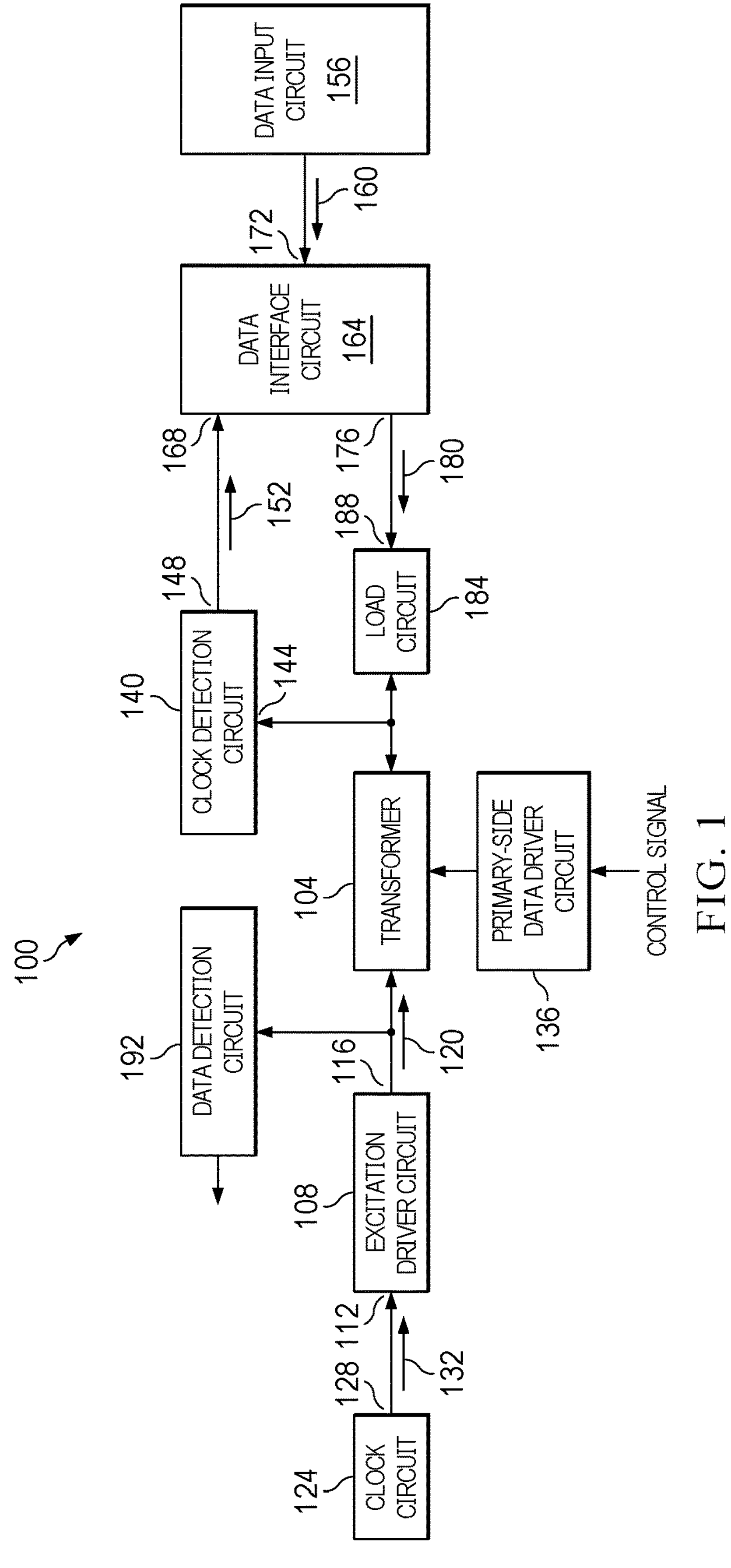
FIG. 1 illustrates a block diagram of an example circuit.

This description relates to circuits and systems that implements a modulation method that facilitates both data and clock transmission over a single physical magnetic channel in isolation communication systems.

In an example, a circuit includes a transformer including a primary coil and a secondary coil, the primary coil and the secondary coil being inductively coupled to one another. The circuit further includes an excitation driver circuit in a primary side of the transformer. In the examples herein, the primary side refers to the primary coil and/or to circuitry coupled to the primary coil of the transformer. The excitation driver circuit is configured to provide an excitation signal to the primary coil at a clock frequency. The excitation signal corresponds to or is indicative of a synchronization clock at the primary side of the transformer. The circuit further includes a clock detection circuit in a secondary side of the transformer. In the examples herein, the secondary side refers to the secondary coil and/or to circuitry coupled to the secondary coil of the transformer. The clock detection circuit is configured to provide a detected clock signal at the clock frequency based on a secondary voltage across the secondary coil responsive to the excitation signal. In some examples, the detected clock signal corresponds to or is indicative of the synchronization clock.

Therefore, by utilizing the excitation driver circuit, the synchronization clock is always available at the primary side and the secondary side of the transformer. In some examples, providing the excitation signal to the primary coil enables the synchronization clock to be available at the secondary side without using a separate coil just for the synchronization clock. Also, this eliminates the need to extract the synchronization clock from the data stream, thereby making this circuit suitable for isolation communication systems that utilize short and intermittent data streams. In the absence of the excitation driver circuit described herein, separate physical magnetic channels (e.g., separate inductive coils) may need to be utilized for the transmission of data and the synchronization clock across the isolation barrier. However, the inductive coils are bulky and expensive, thereby increasing the size and cost of the isolation communication system. Further, in the absence of the excitation driver circuit described herein, in other examples, the synchronization clock may need to be extracted from the data stream itself. However, in such examples, the data stream often needs to have a specified minimum length to facilitate the extraction of the synchronization clock from the data stream. In some existing isolation communication systems that utilize a single magnetic channel for both power and data transfer in a time-multiplexed manner, a synchronization clock cannot be efficiently recovered from the data stream in circumstances where the data stream would be relatively short and intermittent.

FIG. 1 illustrates a block diagram of an example circuit 100. In some examples, the circuit 100 is implemented as part of an integrated circuit (IC). The circuit 100 includes a transformer 104 that includes a primary coil (not shown) and a secondary coil (not shown) that are inductively coupled to one another. The circuit 100 further includes an excitation driver circuit 108 having a driver input 112 and a driver output 116. The driver output 116 is coupled to the primary coil. The excitation driver circuit 108 is configured to provide an excitation signal 120 at the driver output 116 and to the primary coil at a clock frequency (e.g., greater than 20 MHz, such as 85 MHz or other frequency). The circuit 100 further includes a clock circuit 124 having a clock output 128 coupled to the driver input 112. The clock circuit 124 is configured to provide a clock signal 132 (e.g., a synchronization clock) at the clock frequency to the excitation driver circuit 108 via the clock output 128. The excitation driver circuit 108 is configured to provide the excitation signal 120 based on the clock signal 132 and therefore, the excitation signal 120 corresponds to or is indicative of the clock signal 132. Thus, the excitation driver circuit 108 is configured to drive the primary coil by providing the excitation signal 120 based on the clock signal 132.

The circuit 100 further includes a primary-side data driver circuit 136 coupled to the primary coil and configured to provide a primary data signal (e.g., forward data) and power signal to the primary coil. The primary-side data driver circuit 136 has one more inputs to receive a control signal (e.g., from a microcontroller) and is configured to provide the primary data signal and the power signal based thereon. The control signal is representative of the primary data signal and the power signal. In some examples, the primary-side data driver circuit 136 provides the primary data signal and power signal to the primary coil in a time-multiplexed manner. In some examples, the primary data signal is serialized using the clock signal 132, and the serialized primary data signal is provided to the primary coil of the transformer 104. The primary data signal that is provided to the primary coil is transferred (e.g., inductively) from the primary side of the transformer 104 to the secondary side of the transformer 104.

The circuit 100 further includes a clock detection circuit 140 having a detection input 144 and a detection output 148. The detection input 144 is coupled to the secondary coil of the transformer 104. The clock detection circuit 140 is configured to provide a detected clock signal 152 at the detection output 148 at the clock frequency based on a secondary voltage Vs across the secondary coil responsive to the excitation signal 120. In some examples, the detected clock signal 152 corresponds to the clock signal 132, such that both clock signals have the same clock frequency. In some examples, the detected clock signal 152 is utilized at the secondary side of the transformer 104 to deserialize the primary data signal (e.g., the forward data) that is transferred to the secondary side of the transformer 104. Further, in some examples, the detected clock signal 152 is utilized for sending data (e.g., a backward data) from the secondary side to the primary side of the transformer 104. For example, the detected clock signal 152 is utilized to serialize the backward data and the serialized backward data is then provided to the primary side (e.g., inductively) through the transformer 104.

The circuit 100 further includes a data input circuit 156 configured to provide an input data 160 (e.g., the backward data). The input data 160 corresponds to data associated with the secondary side of the transformer 104. In some examples, the input data 160 can include diagnostic data, data specifying one or more operating parameters at the secondary side, data required for power control at the primary side, etc.

The circuit 100 further includes a data interface circuit 164 having a clock input 168, a data input 172 and an interface output 176. The clock input 168 is coupled to the detection output 148 to receive the detected clock signal 152. Further, the data input 172 is coupled to the data input circuit 156 to receive the input data 160. The data interface circuit 164 is configured to provide a secondary data signal 180 at the interface output 176 based on the detected clock signal 152 at the clock input 168 and the input data 160 at the data input 172. In some examples, the data interface circuit 164 includes a data serializer that serializes the input data 160 based on the detected clock signal 152 to form the secondary data signal 180.

The circuit 100 further includes a load circuit 184 coupled between the interface output 176 and the secondary coil. The load circuit 184 includes a modulation input 188 coupled to the interface output 176. The load circuit 184 can be configured to modulate a load impedance (e.g., a capacitance) of the load circuit 184 based on the secondary data signal 180. In some examples, modulating the load impedance of the load circuit 184 enables transfer of the secondary data signal 180 to the primary side. More particularly, a primary input impedance Zin of the primary coil of the transformer 104 is modulated responsive to the modulated load impedance by the load circuit 184, which can then be utilized to detect the secondary data signal 180 in the primary side, of which further details are given in examples below. In some examples, the circuit 100 further includes a data detection circuit 192 coupled to the primary coil of the transformer 104 and is configured to detect modulation of the primary input impedance Zin, which is induced across the primary coil responsive to the modulated load impedance of the load circuit 184. Therefore, by utilizing the excitation driver circuit 108 to drive the primary coil, both the synchronization clock and data (e.g., forward data/backward data) are transferred over the same coil (e.g., the primary coil), thereby eliminating the need for separate coils for the synchronization clock and the data. Further, by utilizing the excitation driver circuit 108, the synchronization clock is always made available on both the primary side and the secondary side, which eliminates the need to extract the synchronization clock from the data stream (e.g., the forward data or the backward data).

In some examples, the transmission of the primary data signal (e.g., the forward data) and power signal from the primary side to the secondary side and the transmission of the secondary data signal 180 from the secondary side to the primary side are controlled in a time-multiplexed manner. In such examples, the primary-side data driver circuit 136 is configured to drive the primary coil at times when the primary data signal (e.g., the forward data) is to be transferred from the primary side to the secondary side and at other times when the power signal is to be transferred from the primary side to the secondary side. Although not shown, the circuit 100 can further include or be coupled to a sequence control circuit (e.g., a microcontroller—not shown) on the primary side that is configured to control the timing of the transmission of the primary data signal (e.g., the forward data) and power signal and the reception of the secondary data signal 180 (e.g., the backward data). In addition, the circuit 100 can further include a time sequencer circuit (not shown) on the secondary side that is configured to synchronize the timing of the transmission of the secondary data signal 180 (e.g., the backward data) with respect to the timing of the primary data signal (e.g., the forward data) and the power signal, such as according to a prescribed timing schedule.

Figure 2:
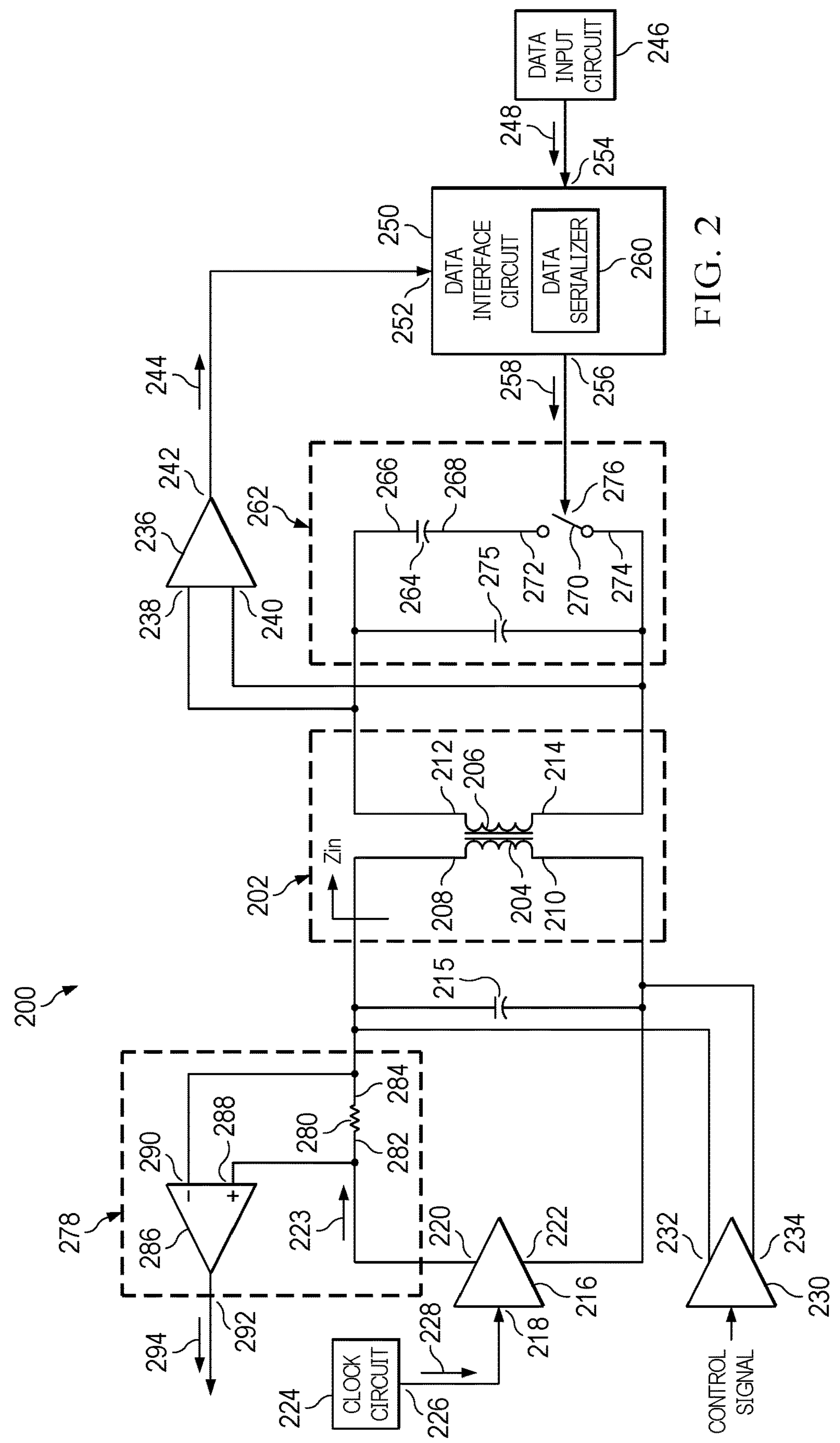
FIG. 2 illustrates an example implementation of a circuit.

FIG. 2 illustrates an example implementation of a circuit 200. The circuit 200 demonstrates one possible implementation of the circuit 100 in FIG. 1. The circuit 200 includes a transformer 202 that includes a primary coil 204 and a secondary coil 206 that are inductively coupled to one another. The primary coil 204 includes a first primary terminal 208 and a second primary terminal 210. The secondary coil 206 includes a first secondary terminal 212 and a second secondary terminal 214. The circuit 200 further includes a capacitor 215 coupled between the first primary terminal 208 and the second primary terminal 210. The circuit 200 further includes an excitation driver circuit 216 having a driver input 218, a first excitation output 220 and a second excitation output 222. In some examples, the first excitation output 220 and the second excitation output 222 together corresponds to the driver output 116 in FIG. 1. The first excitation output 220 is coupled to the first primary terminal 208 of the primary coil 204 and the second excitation output 222 is coupled to the second primary terminal 210 of the primary coil 204.

The circuit 200 further includes a clock circuit 224 having a clock output 226 coupled to the driver input 218. The clock circuit 224 is configured to provide a clock signal 228 (e.g., a synchronization clock) at the clock frequency to the excitation driver circuit 216 via the clock output 226. The excitation driver circuit 216 is configured to provide an excitation signal 223 at the first excitation output 220 and the second excitation output 222 to the primary coil 204. The excitation signal 223 thus has a clock frequency based on the clock signal 228, such that the excitation signal 223 corresponds to or is indicative of the clock signal 228.

The circuit 200 further includes a primary-side data driver circuit 230 having a first driver output terminal 232 and a second driver output terminal 234. The first driver output terminal 232 is coupled to the first primary terminal 208 of the primary coil 204, and the second driver output terminal 234 is coupled to the second primary terminal 210 of the primary coil 204. The primary-side data driver circuit 230 is configured to provide a primary data signal (e.g., a forward data) and power signal to the primary coil 204. In some examples, the primary-side data driver circuit 230 receives a control signal (e.g., from a microcontroller) and is configured to provide the primary data signal and the power signal based on such control signal. The control signal is representative of the primary data signal and the power signal. In some examples, the primary-side data driver circuit 230 provides the primary data signal and power signal to the primary coil 204 in a time-multiplexed manner.

The secondary side of the circuit 200 further includes a clock detection circuit 236 having a first detection input 238, a second detection input 240 and a detection output 242. In some examples, the first detection input 238 and the second detection input 240 together correspond to the detection input 144 in FIG. 1. The first detection input 238 is coupled to the first secondary terminal 212 of the secondary coil 206 and the second detection input 240 is coupled to the second secondary terminal 214 of the secondary coil 206. The clock detection circuit 236 is configured to provide a detected clock signal 244 at the detection output 242 with the clock frequency based on a secondary voltage Vs across the secondary coil 206. The secondary voltage Vs is induced across the secondary coil 206 responsive to the excitation signal 223. In some examples, the detected clock signal 244 has the same clock frequency as the clock signal 228. In some examples, the detected clock signal 244 is utilized at the secondary side of the transformer 202 to deserialize the primary data signal (e.g., the forward data) that is transferred to the secondary side of the transformer 202. Further, in some examples, the detected clock signal 244 is utilized to clock data (e.g., a backward data) that is sent from the secondary side to the primary side of the transformer 202. That is, the detected clock signal 244 is utilized to serialize the backward data and the serialized backward data is then provided to the primary side.

The circuit 200 further includes a data input circuit 246 configured to provide input data 248 (e.g., the backward data). In some examples, the input data 248 corresponds to data associated with the secondary side of the transformer 202. The input data 248 can include diagnostic data, data required for power control at the primary side, etc. The circuit 200 further includes a data interface circuit 250 having a clock input 252, a data input 254 and an interface output 256. The clock input 252 is coupled to the detection output 242 to receive the detected clock signal 244. Further, the data input 254 is coupled to the data input circuit 246 to receive the input data 248. The data interface circuit 250 is configured to provide a secondary data signal 258 at the interface output 256 based on the detected clock signal 244 at the clock input 252 and the input data 248 at the data input 254. In some examples, the data interface circuit 250 includes a data serializer 260 that serializes the input data 248 based on the detected clock signal 244 to form the secondary data signal 258.

The circuit 200 further includes a load circuit 262 coupled between the interface output 256 and the secondary coil 206. In the example of FIG. 2, the load circuit 262 includes a capacitor 264 having a first capacitor terminal 266 and a second capacitor terminal 268. The load circuit 262 further includes a switch 270 having a first switch terminal 272, a second switch terminal 274 and the modulation input 276. The first capacitor terminal 266 is coupled to the first secondary terminal 212 of the secondary coil 206 and the second capacitor terminal 268 is coupled to the first switch terminal 272 of the switch 270. In addition, the second switch terminal 274 of the switch 270 is coupled to the second secondary terminal 214 of the secondary coil 206, and the modulation input 276 of the switch 270 is coupled to the interface output 256. The load circuit 262 can also include a load capacitor 275 that is coupled between the first capacitor terminal 266 of the capacitor 264 and the second switch terminal 274 of the switch 270. The load circuit 262 is configured to modulate a load impedance of the load circuit 262 based on the secondary data signal 258. For example, when the secondary data signal 258 is provided (or has a first state) to the modulation input 276, the switch 270 is closed, thereby setting the load impedance to a first impedance value. Further, when the secondary data signal 258 is not provided (or has a second state) to the modulation input 276, the switch 270 is open, thereby setting the load impedance to a second impedance value. By varying the secondary data signal 258 over time, the load impedance is modulated accordingly. In some examples, modulating the load impedance of the load circuit 262 transfers the secondary data signal 258 to the primary side through the transformer 202. More particularly, a primary input impedance Zin is modulated across the primary coil 204 of the transformer 202 responsive to the modulated load impedance of the load circuit 262.

The circuit 200 further includes a data detection circuit 278 configured to detect the secondary data signal 258 (e.g., backward data) based on modulation of the primary input impedance Zin induced across the primary coil 204. In the example of FIG. 2, the data detection circuit 278 includes a data output resistor 280 having a first resistor terminal 282 and a second resistor terminal 284. The first resistor terminal 282 is coupled to the first excitation output 220 of the excitation driver circuit 216 and the second resistor terminal 284 is coupled to the first primary terminal 208 of the primary coil 204. The data detection circuit 278 further includes a data output circuit 286, such as an operational amplifier, having a first data input terminal 288, a second data input terminal 290 and a data output terminal 292. The first data input terminal 288 is coupled to the first resistor terminal 282 of the data output resistor 280 and the second data input terminal 290 is coupled to the second resistor terminal 284 of the data output resistor 280.

The data output circuit 286 is configured to detect a voltage ΔV across the data output resistor 280 to detect the secondary data signal 258. The data output circuit 286 is configured to provide a data output signal 294 at 292 based on the voltage ΔV across the data output resistor 280. In some examples, the data output signal 294 corresponds to the secondary data signal 258 (or demodulated data). In some examples, the voltage ΔV across the data output resistor 280 is given by:

$$\Delta V = Vdr\frac{R}{(R + Zin)} \tag{1}$$

Where Vdr is the voltage induced between the first excitation output 220 and the second excitation output 222 of the excitation driver circuit 216, R is the resistance of the data output resistor 280 and Zin is the primary input impedance induced across the primary coil 204.

In some examples, the clock frequency of the clock signal 228 is set to be at a resonant frequency of the tank circuit formed by the capacitor 215 and the primary coil 204. In some examples, setting the clock frequency at the resonant frequency of the tank circuit facilitates to achieve a maximum variation of the primary input impedance Zin, in accordance with the modulation of the load impedance on the secondary side. For example, when the clock frequency is set at the resonant frequency of the tank circuit, a difference between the value of the primary input impedance Zin when the input data 248 is present and when the input data 248 is not present is at or near the maximum, thereby facilitating an efficient detection of the secondary data signal 258 (e.g., by the data detection circuit 278) on the primary side.

Figure 3:
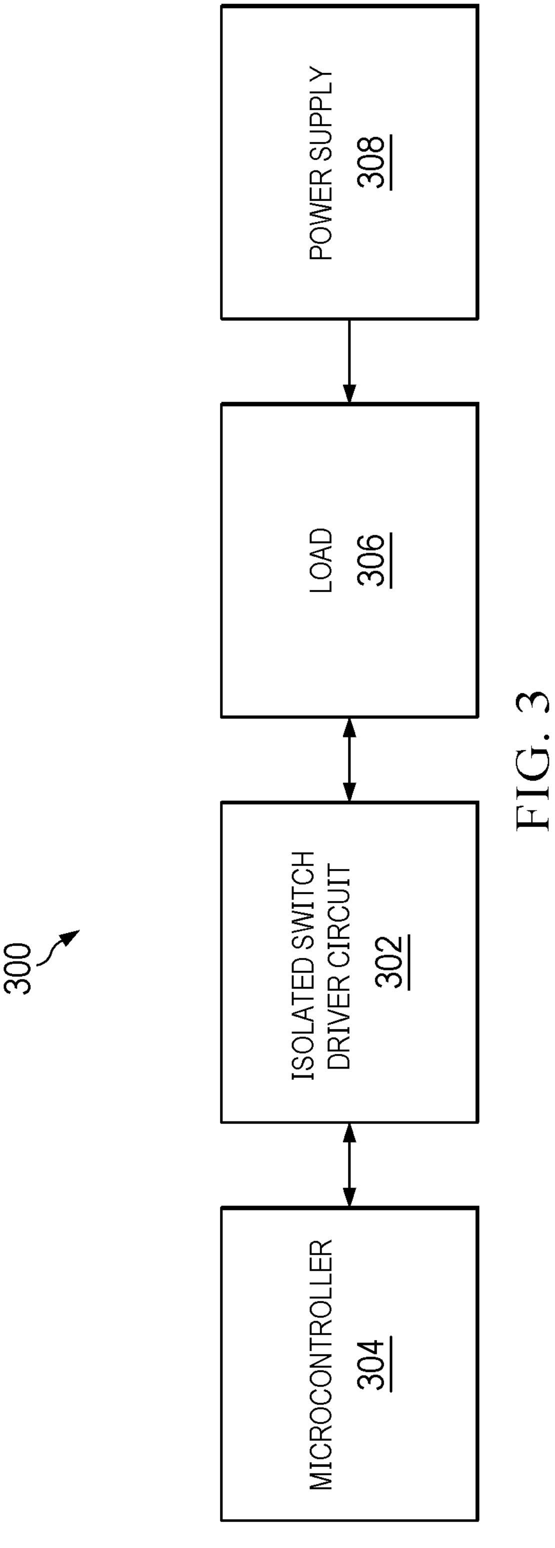
FIG. 3 illustrates an example system.

FIG. 3 illustrates an example system 300. The system 300 includes an isolated switch driver circuit 302 that is configured to provide bidirectional communication through an isolation barrier. In some examples, the isolated switch driver circuit 302 can be same as the circuit 100 in FIG. 1 or the circuit 200 in FIG. 2, which can be implemented in an IC or a system on chip (SOC). The system 300 further includes a microcontroller 304 that is coupled to the isolated switch driver circuit 302. In some examples, the microcontroller 304 is configured to provide a control signal (e.g., the control signal at the input of the primary-side data driver circuit 136 in FIG. 1) to the isolated switch driver circuit 302. In some examples, the control signal is representative of forward data or power that is to be communicated to the secondary side. Furthermore, the system 300 includes a load 306. In some examples, the isolated switch driver circuit 302 is coupled to the load 306 and configured to provide a data stream (e.g., forward data or power) received from the microcontroller 304 to the load 306. In some examples, the load 306 is configured to provide a backward data stream (e.g., input data 160 in FIG. 1) to the isolated switch driver circuit 302, which is further configured to provide the backward data stream for further processing (e.g., to be provided to the microcontroller 304). In addition, the system 300 includes a power supply 308 that is coupled to the load 306.

Figure 4:
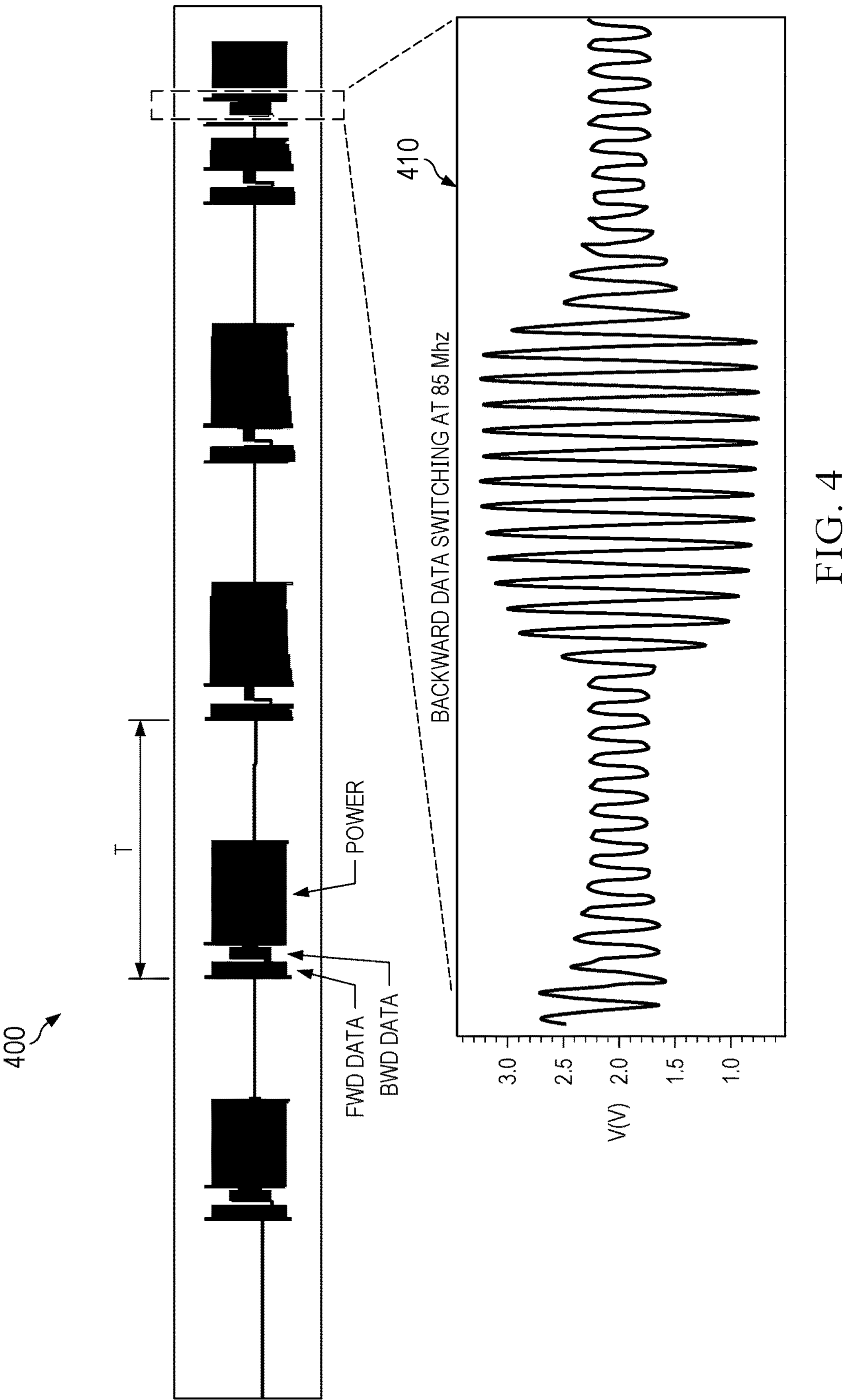
FIG. 4 illustrates an example transmission of forward (FWD) data, backward (BWD) data and power in a time-multiplexed manner in a circuit.

FIG. 4 illustrates an example transmission 400 of forward (FWD) data, backward (BWD) data and power in a time-multiplexed manner, which can be communicated in a circuit. In some examples, the circuit can correspond to the circuit 100 in FIG. 1 or the circuit 200 of FIG. 2 or the circuit 302 of FIG. 3. For example, the FWD data can correspond to the primary data signal in FIG. 1, the power can correspond to the power signal in FIG. 1 and the BWD data can correspond to the secondary data signal 180 in FIG. 1. In a time period of T (e.g., T=25 μs), the FWD data is transmitted from the primary side of the circuit to the secondary side during a first portion of T, then the BWD data is transmitted from the secondary side to the primary side during a second portion of T and the power is transmitted from the primary side to the secondary side during a third portion of T. Following the transmission of power, there is an idle time for the remaining portion of the time period T until the end of the time period T. In some examples, the FWD data, the BWD data and the power are switched/modulated at the clock frequency (e.g., 85 MHz). FIG. 4 also shows an enlarged view of the BWD data, shown at 410, which is communicated from the secondary side at the clock frequency in a respective time period.

Figure 5:
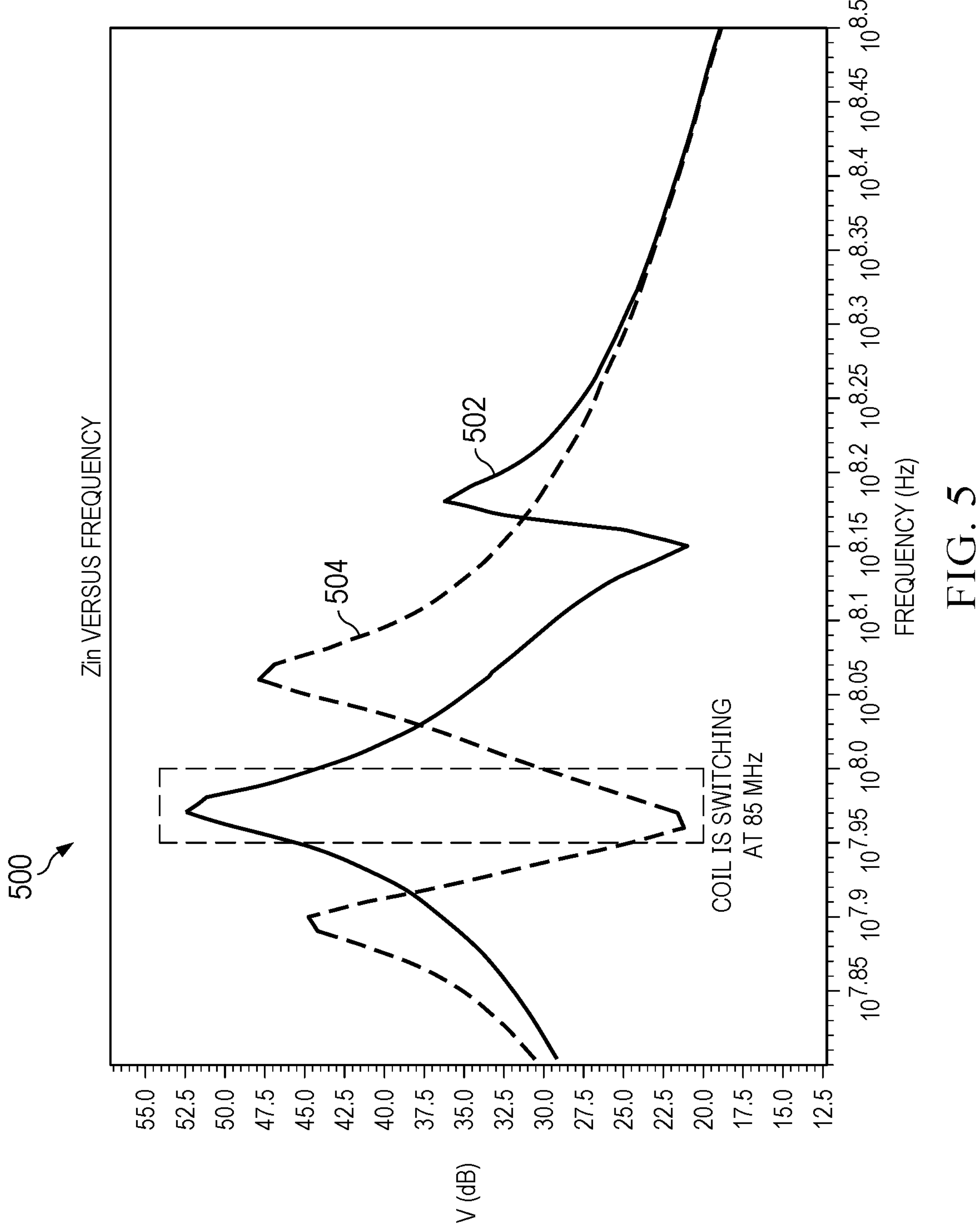
FIG. 5 illustrates a graph showing a variation of the primary input impedance Zin with respect to the clock frequency in an example.

FIG. 5 illustrates a graph 500 showing a variation of the primary input impedance Zin with respect to the clock frequency. In some examples, the graph 500 is applicable to the circuit 100 in FIG. 1 or the circuit 200 in FIG. 2. The graph 500 is described herein with reference to the circuit 200 in FIG. 2. The plot 502 depicts a variation of the primary input impedance Zin with frequency when the backward data (e.g., the input data 248) is present (e.g., data signal is logic 1 or high). The plot 504 depicts a variation of the primary input impedance Zin with frequency when the backward data (e.g., the input data 248) is not present (e.g., data signal is logic 0 or low). As can be seen in FIG. 5, when the clock frequency is at 85 MHZ (e.g., the resonant frequency), the variation of the primary input impedance Zin is maximum. In other words, a difference between the value of the primary input impedance Zin when the input data 248 is present and when the input data 248 is not present is the maximum, thereby facilitating an efficient detection of the secondary data signal 258 on the primary side, such as described herein.

Figure 6:
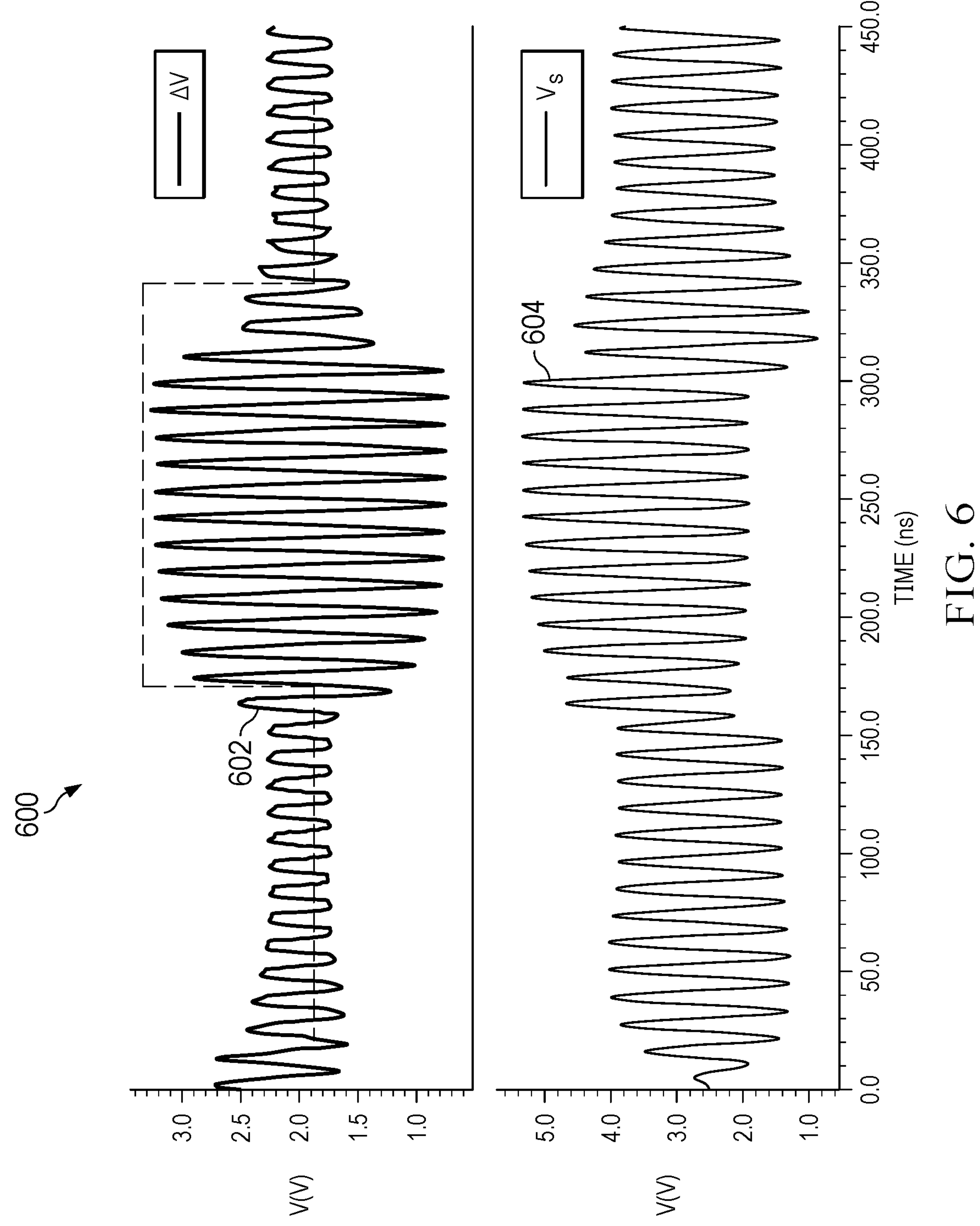
FIG. 6 illustrates a graph that depicts, in an example, various signals associated with the circuit in FIG. 1.

FIG. 6 illustrates a graph 600 that depicts various signals associated with the circuit 100 in FIG. 1. The graph 600 is also applicable to the circuit 200 in FIG. 2, and is therefore described herein with reference to FIG. 2. The plot 602 depicts an example of the voltage ΔV across the data output resistor 280 in FIG. 2. As described herein, the voltage ΔV corresponds to the backward data (e.g., the secondary data signal 258 in FIG. 2), as represented by the induced modulation of the primary input impedance Zin. As can be seen, the voltage ΔV is modulated at clock frequency (e.g., 85 MHZ). The plot 604 depicts an example of the secondary voltage Vs across the secondary coil 206 responsive to the excitation signal 223 of FIG. 2. In some examples, the secondary voltage Vs corresponds to a synchronization clock at the secondary side. As can be seen, the synchronization clock is always available at the secondary side, irrespective of the state of backward data.

In this description, the term "based on" means based at least in part on.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A circuit, comprising:

a transformer including a primary coil and a secondary coil;

an excitation driver circuit having a driver input and a driver output, wherein the driver output is coupled to the primary coil;

a clock circuit having a clock output coupled to the driver input;

a clock detection circuit having a detection input and a detection output, wherein the detection input is coupled to the secondary coil;

a data interface circuit having a clock input, a data input and an interface output, the clock input coupled to the detection output; and a circuit coupled between the interface output and the secondary coil, the load circuit including a modulation input coupled to the interface output.

2. The circuit of claim 1, wherein the driver output includes first and second excitation outputs, wherein the first excitation output is coupled to a first primary terminal of the primary coil and the second excitation output is coupled to a second primary terminal of the primary coil.

3. The circuit of claim 2, further including a data detection circuit that includes a data output resistor having a first resistor terminal and a second resistor terminal, in which the first resistor terminal is coupled to the first excitation output, and the second resistor terminal is coupled to the first primary terminal.

4. The circuit of claim 3, wherein the data detection circuit further includes a data output circuit having a first data input terminal, a second data input terminal and a data output terminal, in which the first data input terminal is coupled to the first resistor terminal of the data output resistor, and the second data input terminal is coupled to the second resistor terminal of the data output resistor.

5. The circuit of claim 2, further including a primary-side data driver circuit having a first driver output terminal and a second driver output terminal, the first driver output terminal is coupled to the first primary terminal of the primary coil, and the second driver output terminal is coupled to the second primary terminal of the primary coil.

6. The circuit of claim 1, wherein the detection input includes a first detection input and a second detection input, wherein the first detection input is coupled to a first secondary terminal of the secondary coil and the second detection input is coupled to a second secondary terminal of the secondary coil.

7. The circuit of claim 6, wherein the data input of the data interface circuit is coupled to a data input circuit.

8. The circuit of claim 6, wherein the circuit includes:

a capacitor having a first capacitor terminal and a second capacitor terminal; and a switch having a first switch terminal, a second switch terminal and the modulation input, wherein the first capacitor terminal is coupled to the first secondary terminal of the secondary coil, the second capacitor terminal is coupled to the first switch terminal of the switch, the second switch terminal of the switch is coupled to the second secondary terminal of the secondary coil, and the modulation input of the switch is coupled to the interface output.

9. The circuit of claim 1, wherein excitation driver circuit is configurable to provide an excitation signal at the driver output and the clock detection circuit is configurable to provide a detected clock signal at the detection output based on a secondary voltage across the secondary coil responsive to the excitation signal.

10. The circuit of claim 9, wherein the excitation signal and the detected clock signal are at a clock frequency.

11. The circuit of claim 8, wherein the data interface circuit is configurable to provide a secondary data signal at the interface output based on the detected clock signal at the clock input and input data received at the data input.

12. The circuit of claim 10, wherein the circuit is configurable to modulate an impedance across the secondary coil responsibe to receiving the secondary data signal at the modulation input form the interface output.

13. A system comprising:

a transformer including a primary coil and a secondary coil;

an excitation driver circuit having a driver input and a driver output, the driver output being coupled to the primary coil, wherein the excitation driver circuit is configurable to provide an excitation signal at a clock frequency at the driver output;

a clock circuit having a clock output coupled to the driver input and configurable to provide a clock signal at the clock frequency at the clock output;

a clock detection circuit having a detection input and a detection output, the detection input being coupled to the secondary coil, wherein the clock detection circuit is configurable to provide a detected clock signal at the clock frequency at the detection output based on a secondary voltage across the secondary coil responsive to the excitation signal;

a data interface circuit having a clock input, a data input and an interface output, the clock input being coupled to the detection output, wherein the data interface circuit is configurable to provide a secondary data signal at the interface output based on the detected clock signal and input data at the data input; and a circuit coupled between the interface output and the secondary coil, the circuit including a modulation input coupled to the interface output, wherein the circuit is configurable to modulate an impedance across the secondary coil responsive to the secondary data signal.

14. The system of claim 13, further including a data detection circuit configurable to detect the secondary data signal based on a primary input impedance induced across the primary coil responsive to the modulated impedance.

* * * * *